(12) United States Patent
Larsen et al.

(10) Patent No.: US 6,365,834 B1
(45) Date of Patent: Apr. 2, 2002

(54) CABLE MANAGEMENT RACK WITH VERTICAL WIRE GUIDES

(75) Inventors: Lars R. Larsen, Old Lyme; Stewart A. Levesque, Scotland, both of CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 09/479,476

(22) Filed: Jan. 10, 2000

(51) Int. Cl.[7] .............................................. H02G 3/00
(52) U.S. Cl. ...................................................... 174/100
(58) Field of Search ............................. 174/100, 12 A, 174/65 R, 71 R, 98, 99 R, 70 R (56) References Cited

U.S. PATENT DOCUMENTS 5,574,251 A * 11/1996 Sevier .......................... 174/50
6,102,214 A * 8/2000 Mendoza ...................... 211/26

* cited by examiner

Primary Examiner—Dean A. Reichard
Assistant Examiner—Adolfo Nino
(74) Attorney, Agent, or Firm—Cummings & Lockwood (57) ABSTRACT

A vertical wire management guide channel assembly for use in cable management racks has an elongated channel member formed of wire stock with a central web portion and side portions with open spaces between spaced wire rod elements. Vertically spaced pairs of arms project outwardly of the side portions and have a pair of vertically spaced horizontally extending rod elements and a vertically extending rod element between the outer ends thereof. Latch members extend transversely between the vertically extending rod portions of the arms, with one end of the latch member being pivotally engaged with the rod portion on one side of the channel member, and the other end of the latch member being releasably engaged with the rod portion on the other side of the channel member.

16 Claims, 7 Drawing Sheets

CABLE MANAGEMENT RACK WITH VERTICAL WIRE GUIDES

BACKGROUND OF THE INVENTION

The present invention relates to wire management racks in which there are mounted numerous relays and connectors, and, more particularly, to vertical wire guide channel members for use in such installations.

In wire management rack installations, it is quite common to have multiple racks arranged in side by side relationship and to have numerous wires and cables (collectively "wires") feeding thereinto and exiting therefrom. Generally, the larger diameter wires are cables containing many conductors and these are fed vertically in channels provided along the sides of the racks and from these channels horizontally to a termination. Some racks use U-shaped uprights at the sides of the rack to provide such channels as well as to provide frame elements on which cross members are mounted to seat the terminal blocks and relays. Because the component conductors must necessarily be routed to different vertical positions, apertures or passages must be provided in the channel forming members for them to pass through.

It will be appreciated that the channel members should not only retain and guide the wires but also provide ease of access and manipulation of the wires. Separate vertical guide members to mount on racks have been proposed in Brey et al. U.S. Pat. No. 4,665,546; Lerman U.S. Pat. No. 5,586,012; and Viklund et al. U.S. Pat. No. 5,902,961. However, such separate attachments have generally been somewhat cumbersome to install, or limiting as to ease of manipulation of the wires in the channel, or relatively expensive.

Accordingly, it is an object of the present invention to provide a novel vertical wire guide channel assembly which is relatively simple and economical to fabricate and easily installed on wire management racks.

It is also an object to provide such a wire guide member channel assembly which can be easily mounted between adjacent racks while permitting ready access to wires disposed in the space between the racks.

Another object is to provide such a wire guide member channel assembly which securely captures the wires within its channel by use of latch members which are easily engaged and released to facilitate access to the wires.

A further object is to provide a multiple wire rack installation using such a vertical wire guide member channel assembly.

SUMMARY OF THE INVENTION

It has now been found that the foregoing and related advantages may be readily attained in a vertical wire management guide channel assembly for use in cable management racks comprising an elongated channel member formed of wire stock with a central web portion and side portions with open spaces between spaced wire rod elements defining the web and side portions. A multiplicity of vertically spaced pairs of arms projecting outwardly of the side portions of the channel member, and each has a pair of vertically spaced horizontally extending rod elements and a vertically extending rod element between the outer ends thereof. Releasable latch members extend transversely between the vertically extending rod portions of the arms, with one end of the latch member being pivotally engaged with the rod portion on one side of the channel member, and the other end of the latch member is releasably engaged with the rod portion on the other side of the channel member. The channel member is dimensioned to permit wires to be seated therein and extend vertically thereof and to exit and enter through the spaces between the wire rods defining the web and side portions. The latch members are readily releasable and pivotable into a channel opening position to facilitate access to and movement of wires in the channel member.

Preferably, the channel member also has U-shaped rod elements spaced vertically along the length thereof, and elongated rod elements extending vertically along the length of the side and web portions, which preferably are formed by three laterally spaced rod elements. Desirably, the pairs of arms are provided by U-shaped members defined by vertically spaced, parallel rod elements having a web portion extending across the web portion of the channel member and arm portions extending along the side portions of the channel member and outwardly therefrom with a connecting portion between the outer ends thereof. The rod elements of the U-shaped members are secured to the rod elements of the channel members at their points of contact.

The assembly includes attachment means spaced vertically along the length of the web portion of the channel member and engaged therewith, and the attachment means is engaged with the uprights of the wire management rack. Preferably, the attachment means includes a first member having a body portion extending across the web portion of the channel member and flange portions engageable with rod elements of the channel member. Fasteners extend through apertures in the body portion for engagement with the uprights, and a second member of generally L-shaped configuration has a body portion engaged with the body portion of the first member and a flange portion engageable with an upright.

The assembly is used in a wire management rack installation provided by a pair of horizontally spaced wire management racks each having a pair of horizontally spaced, vertically extending uprights and vertically spaced horizontally extending rails therebetween. The vertical wire management guide channel assembly extends between and is secured to the adjacent uprights of the pair of cable management racks.

DETAILED DESCRIPTION OF THE PREFERRED EMBODIMENTS

Figure 1:
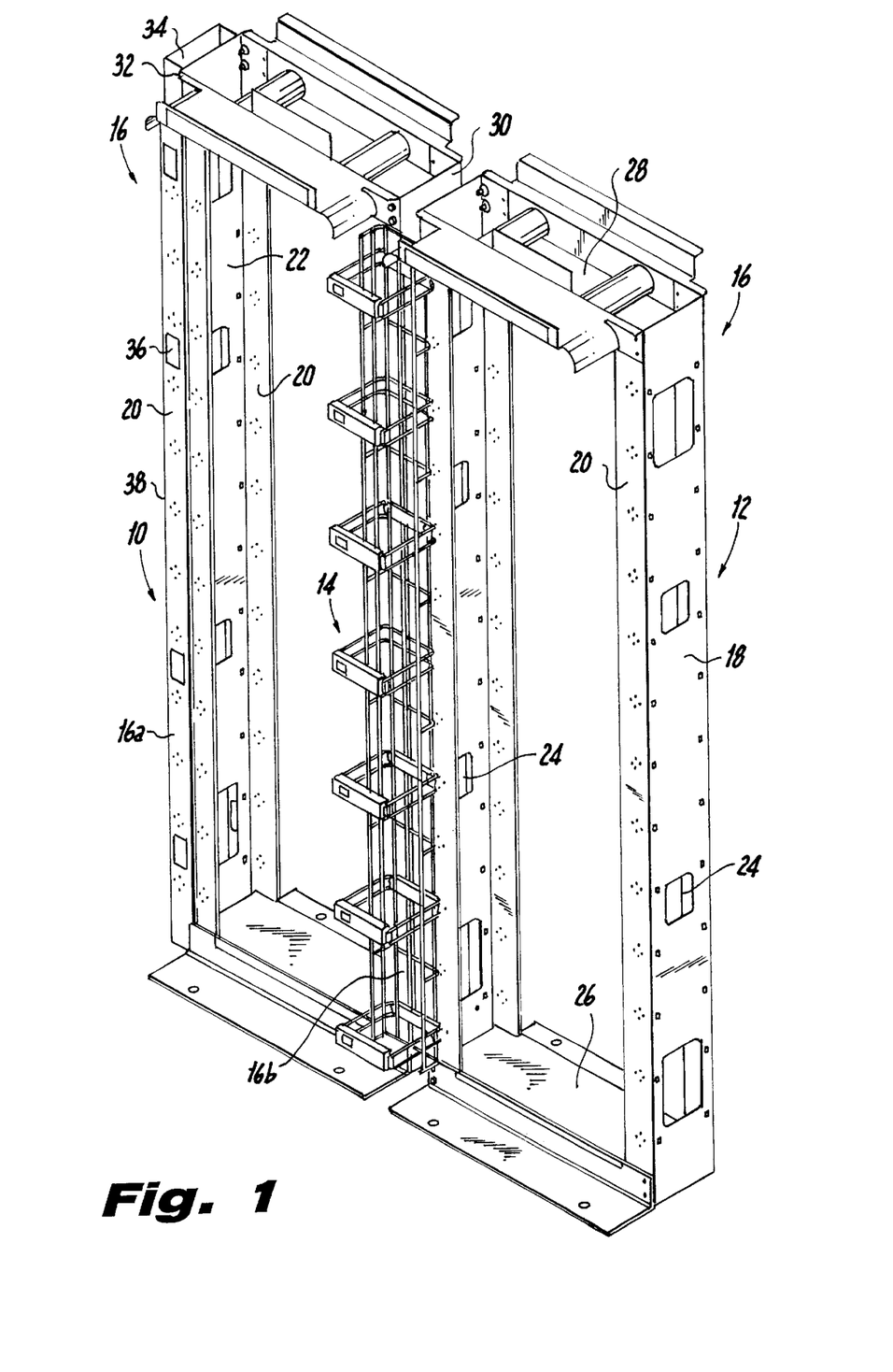
FIG. 1 is a perspective view of a wire management rack installation incorporating the vertical wire management channel assembly of the present invention.

Turning first to FIG. 1, therein illustrated is a wire management rack installation embodying the present invention and generally comprised of a pair of wire management racks generally designated by the numerals 10, 12 and horizontally spaced to provide a space or channel 30 therebetween. Extending across the space 30 and secured to both racks 10, 12 is a vertical wire guide channel assembly generally designated by the numeral 14.

The racks 10, 12 each have a pair of horizontally spaced uprights 16a, 16b of U-shaped cross section between which extend a base rail 26 and a top rail 28. The uprights 16 have a web portion 18 and side walls 20 which define a vertical channel 22, and the web portion 18 has a series of vertically spaced apertures 24 therein through which wires (not shown) may pass from and into the channel 22. The upright 16a has an end upright 32 of U-shaped cross section providing an internal or closed channel 34 and the end upright 32 also has apertures 36 in its side wall 38.

Figure 2:
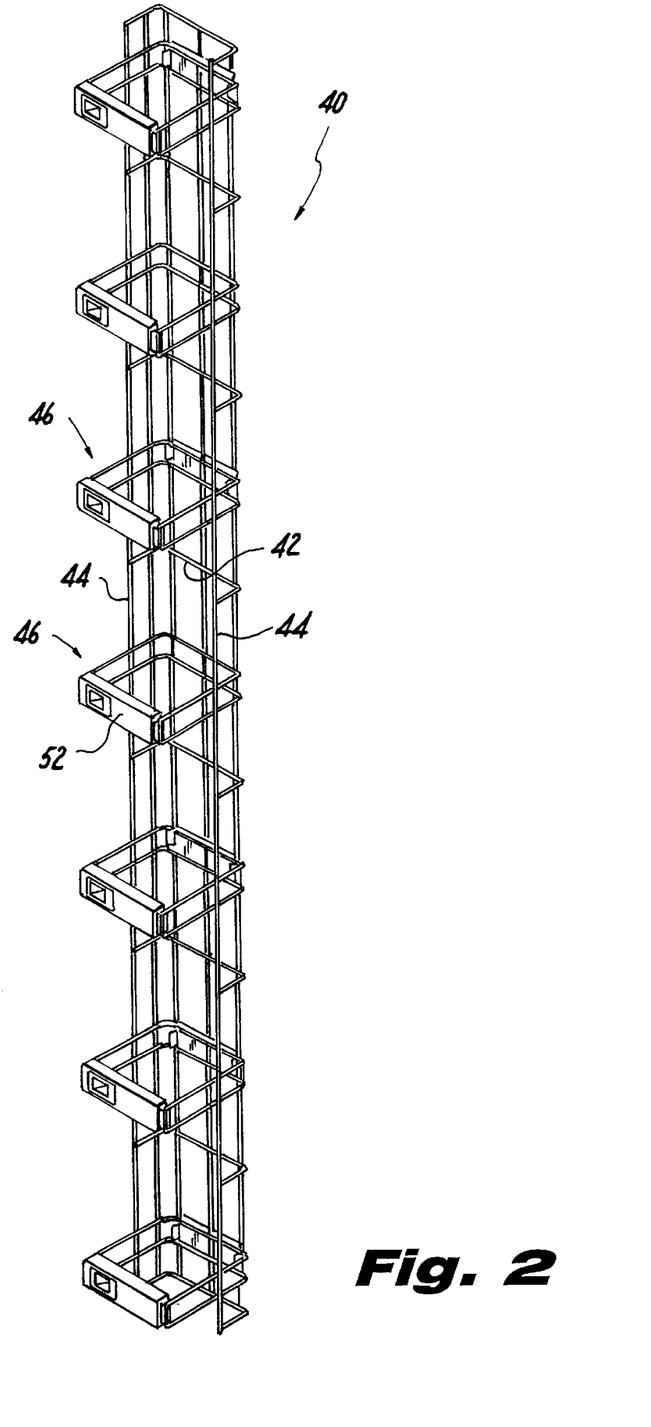
FIG. 2 is perspective view to an enlarged scale of the wire management channel assembly of FIG. 1.
Figure 3:
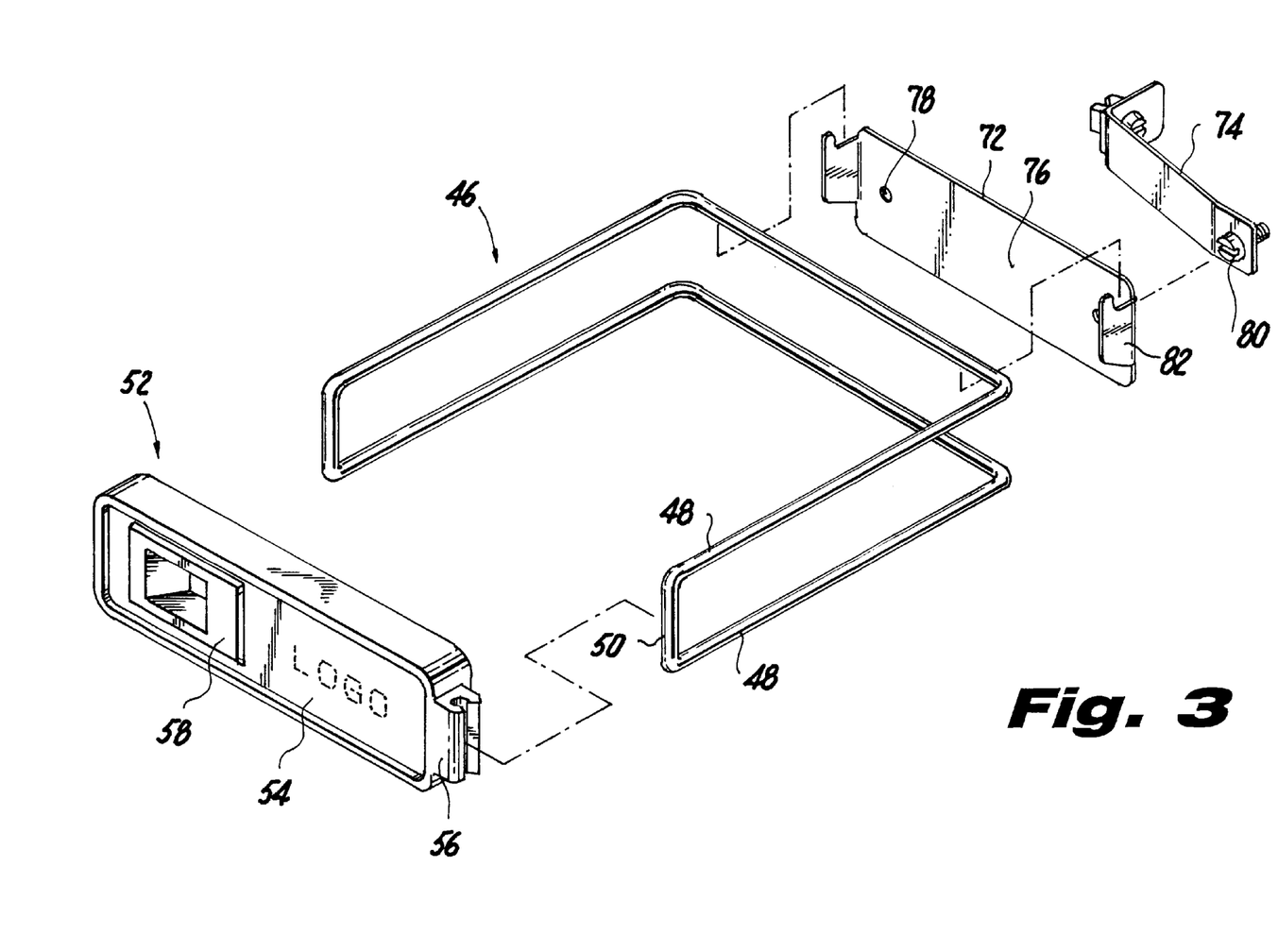
FIG. 3 is a partially exploded view to an enlarged scale of the arm and latch subassembly and of the mounting subassembly.

Turning next to FIG. 2, the vertical wire guide channel assembly 14 can be seen to have a U-shaped channel member formed of wire stock and generally designated by the numeral 40. The center or web portion 42 and the side portions 44 each are defined by three elongated rod elements and U-shaped tie members. A multiplicity of arm members generally designated by the numeral 46 having a U-shaped configuration are spaced along the length of the channel member 40. The arm members 46 extend outwardly of the side portions 44 of the channel member 40 and are formed by a pair of vertically spaced horizontally extending rod elements 48 and vertically extending rod end elements 50 between the outer ends thereof.

Extending between the outer ends of the arm members 46 are latch members generally designated by the numeral 52, and they have a housing 54 with a body portion of generally U-shaped cross section. At one end thereof is a channel providing boss 56 into which an end rod element 50 will snap to provide a pivotal mounting therefor. At the other end of the body portion of the housing 54 there is slidably mounted in a slot therein a latch 58 which will engage the other end rod element 50.

Figure 4:
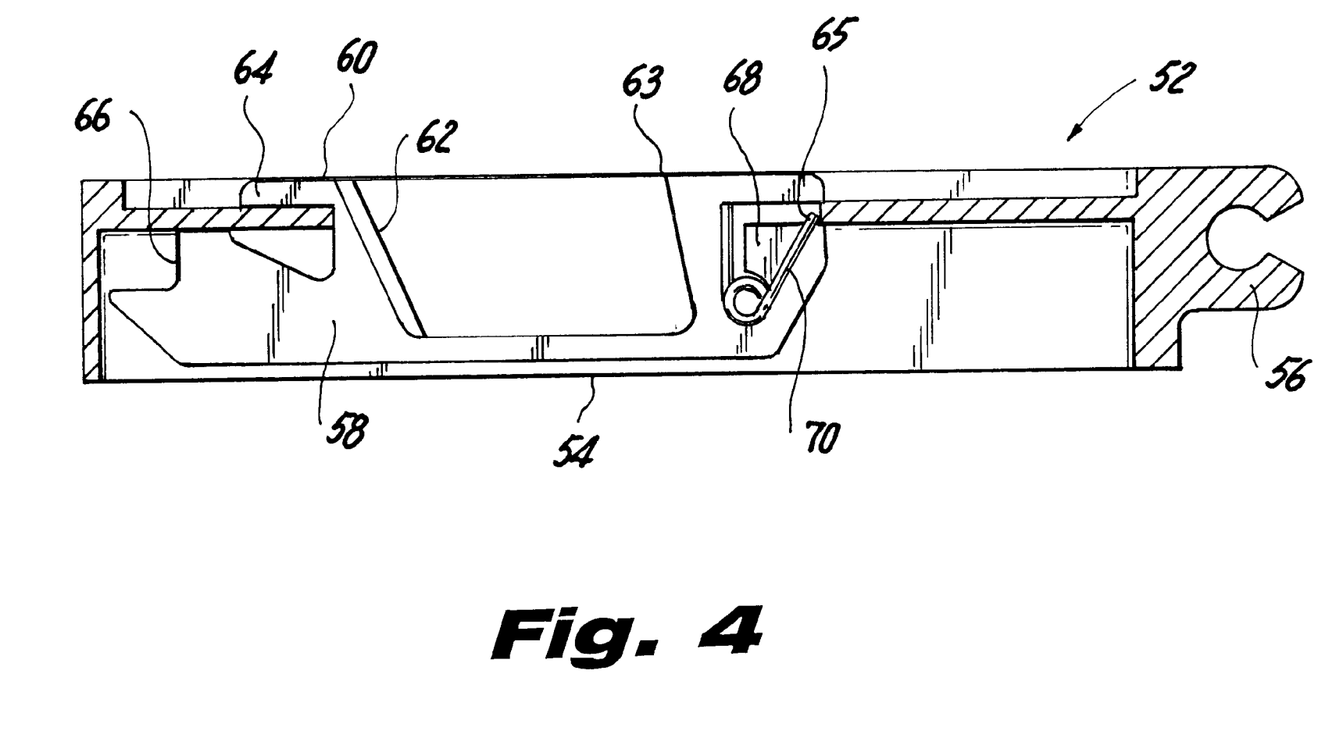
FIG. 4 is a cross sectional view of the arm and latch assembly as assembled.
Figure 5A:
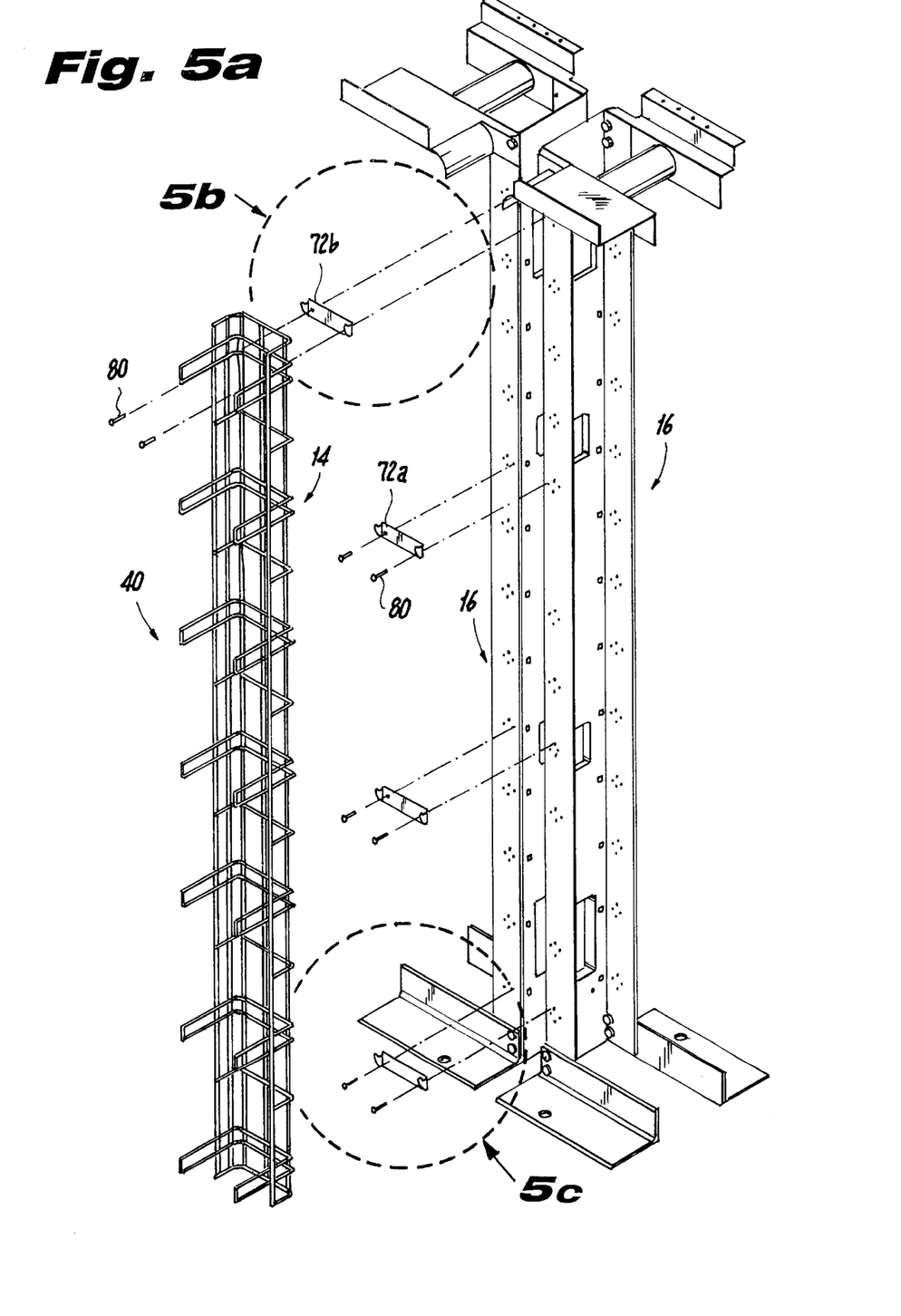
FIGS. 5a, 5b and 5c are fragmentary perspective views of the rack and mounting elements as applied to a pair of racks.
Figure 5B:
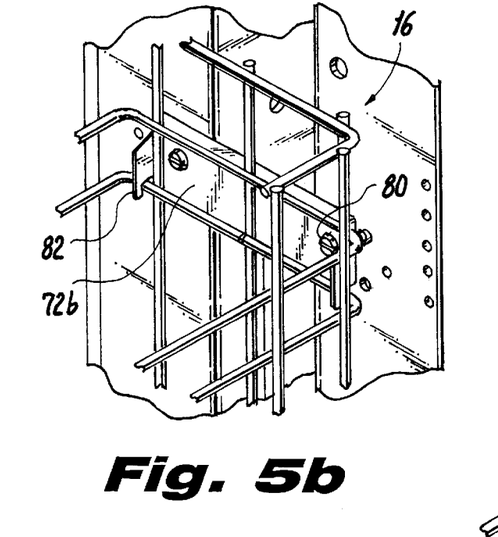
Figure 5C:
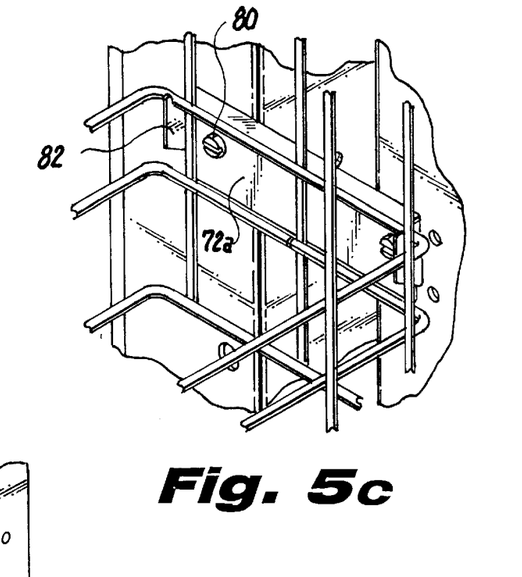

As seen in FIG. 4, the latch 58 has an outer face 60 with a recess 62 therein and providing a flange 63 about the body 64 which slidably seats in the slot 65 formed in the body portion of the housing 54. At the one end of the body 64 is a recess 66 which seats an end rod element 50 and at the other end is a recess 68 in which is seated a spring 70 which biases the latch to trap the rod element 50. To release the latch 58 and allow the latch member 52 to be pivoted into an open position, the latch 58 is pushed in the direction of the pivoted end of the latch member 52 against the biasing pressure of the spring 70.

As seen in FIG. 4, the guide channel assembly 14 is mounted between the racks 10, 12 by the mounting elements 72 which have a planar center portion 76 with apertures 78 which seat fasteners 80 and flanges 82 which seat the arm members 46. Several mounting elements 74 are spaced vertically along the uprights 16 and secured by fasteners 80 which extend into apertures in the uprights 16. Several elements 74a are oriented with the flanges 82 disposed upwardly, and the guide channel assembly 14 is seated thereon. After seating of the guide channel assembly 14 on the elements 74a, another mounting element 74b is inverted and mounted adjacent the top of the channel guide assembly 14 so that its flanges 82 bear downwardly on the arm member 46.

Figure 6A:
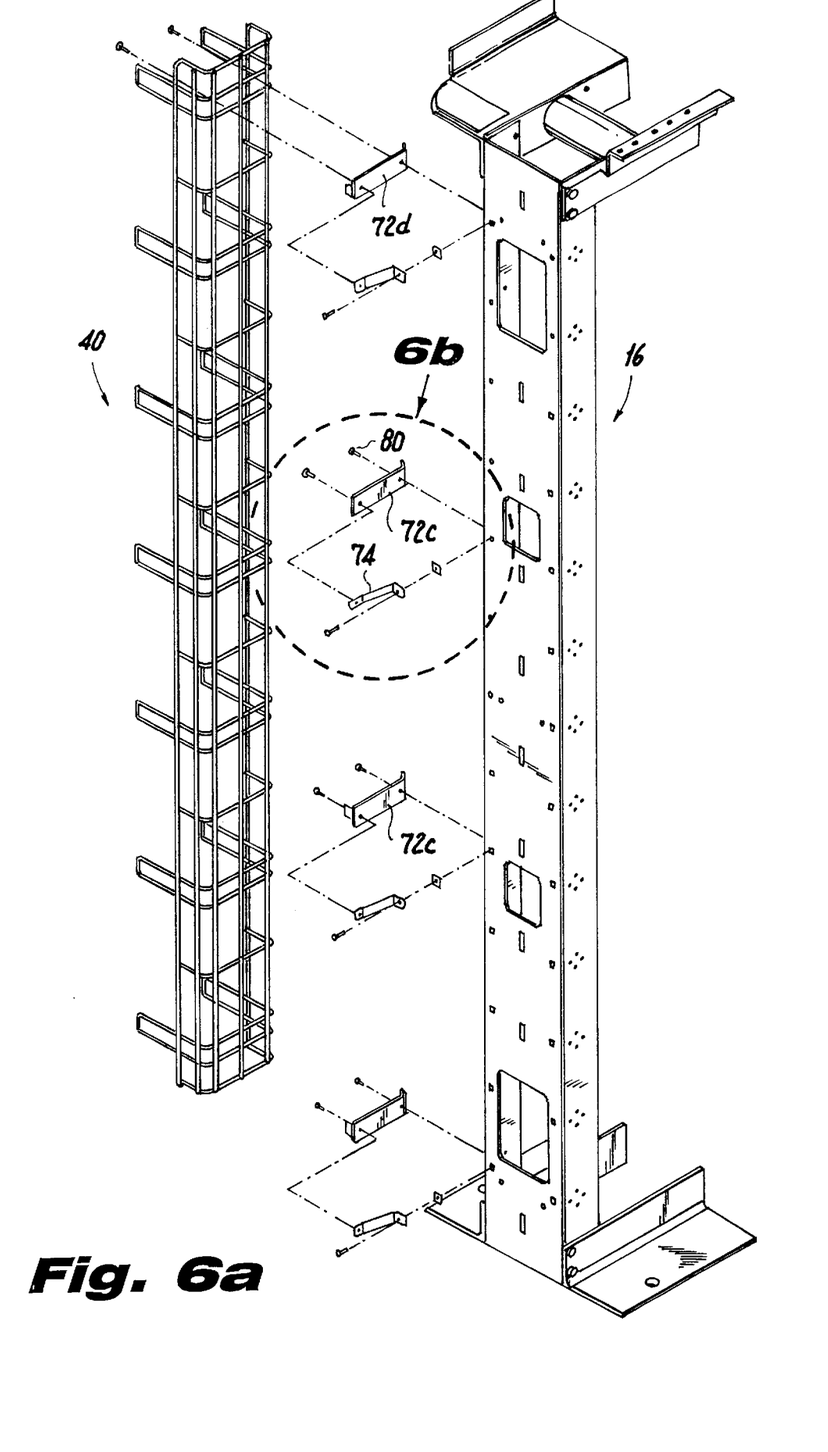
FIG. 6 is a fragmentary perspective view of the rack and mounting elements as applied to a single rack.
Figure 6B:
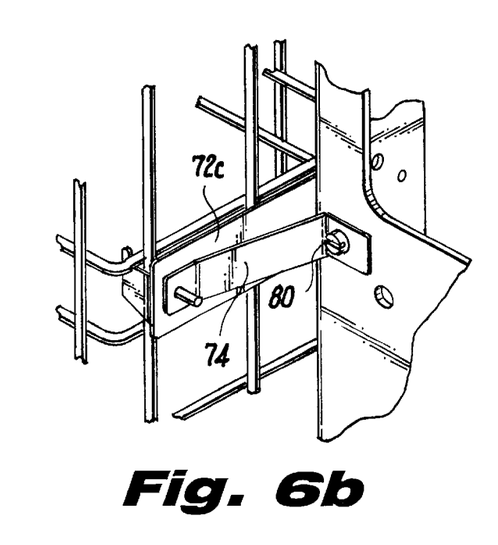

In FIG. 6, the guide channel assembly 14 is mounted on a single rack 10 by securing the end of the elements 72 to the outer side of the upright 16 with the flanges 82 extending upwardly. The longer leg of the L-shaped element 74 is secured to the element 72 by a fastener 80, and the shorter leg is mounted to the web 18 by the upright 16.

After seating of the guide channel assembly 16 on the elements 72c, another element 72c is mounted thereabove with its flanges 82 facing downwardly, and it is secured to the upright 16 by the element 74d.

The U-shaped channel member and arm members are all readily formed by bending rod stock conveniently of about 0.187 inch diameter (3/16 inch), and all points of intersection are resistance welded to provide a secure assembly.

The latch members are readily fabricated from synthetic resin as two separate elements and then assembled with the spring. The direction of mounting can be altered so that the latch member can either be left-handed or right-handed by simply inverting it. Conveniently, the arm members for the latches are spaced at one foot intervals along the length of the guide channel member.

Thus, it can be seen that the vertical wire guide channel assembly of the present invention can be utilized in multi-rack installations between adjacent racks as well as on the ends of individual racks or racks in an array. Because of the open nature of the assembly, wires can be led inwardly and outwardly through the sides and through the back so that the wires can be inserted into and moved outwardly with facility. The wire guide assembly is relatively simple and economical to fabricate and to install.

What is claimed is:

1. A vertical wire management guide channel assembly for use in cable management racks comprising:
   (a) an elongated channel member formed of wire stock with a central web portion and side portions with open spaces between spaced wire rod elements defining said central web portion and said side portions;
   (b) a multiplicity of vertically spaced pairs of arms projecting outwardly of said side portions and each having a pair of vertically spaced horizontally extending rod elements and a vertically extending rod element between the outer ends of the spaced pairs of arms; and
   (c) latch members extending transversely between said vertically extending rod portions of said arms, one end of said latch members being pivotally engaged with the rod portion on one side of the channel member, the other end of said latch members having a releasable latch engaged with the rod portion on the other side of said channel member, said channel member being dimensioned to permit wires to be seated therein and extend vertically thereof and to exit and enter through the spaces between said wire rods defining said central web portion and said side portions, and said latch members being readily releasable and pivotable into a channel opening position to facilitate movement of wires in said channel member.

2. The vertical wire management guide channel assembly in accordance with claim 1 wherein said channel member further comprises:
   (a) a plurality of elongated rod elements extending vertically along a length of said side portions and said central web portion; and
   (b) a plurality of U-shaped rod elements spaced vertically along the length thereof.

3. The vertical wire management guide channel assembly in accordance with claim 2 wherein each of said central web portion and said side portions further comprises three laterally spaced rod elements.

4. The vertical wire management guide channel assembly in accordance with claim 1 wherein said pair of arms is provided by U-shaped members defined by vertically spaced, horizontally extending rod elements having a web portion extending across said central web portion of said channel member and arm portions extending along said side portions of said channel member and outwardly therefrom with a connecting portion between the outer ends of said arm portions.

5. The vertical wire management guide channel assembly in accordance with claim 4 wherein said rod elements of said U-shaped members are secured to said rod elements of said channel members at their points of contact.

6. The vertical wire management guide channel assembly in accordance with claim 1 wherein there are included attachment means spaced vertically along the length of said central web portion of said channel member and engaged therewith, said attachment means being engageable with the uprights of the wire management rack.

7. The vertical wire management guide channel assembly in accordance with claim 6 wherein said attachment means includes a first member having a body portion extending across said central web portion of said channel member and flange portions engageable with rod elements of said channel member and fasteners extending through apertures in said body portion for engagement with the uprights.

8. The vertical wire management guide channel assembly in accordance with claim 7 wherein said attachment means includes a second member of generally L-shaped configuration with a body portion engageable with said body portion of said first member and a flange portion engageable with an upright.

9. A wire management rack installation comprising:
(a) a pair of horizontally spaced wire management racks each having a pair of horizontally spaced, vertically extending uprights and vertically spaced horizontally extending rails therebetween; and
(b) a vertical wire management guide channel assembly extending across the space between the adjacent uprights of said pair of cable management racks comprising:
(i) an elongated channel member formed of wire stock with a central web portion and side portions with open spaces between spaced wire rod elements defining said central web portion and said side portions;
(ii) a multiplicity of vertically spaced pairs of arms projecting outwardly of said side portions and each having a pair of vertically spaced horizontally extending rod elements and a vertically extending rod element between the outer ends of said spaced pairs of arms; and
(iii) latch members extending transversely between said vertically extending rod portions of said arms, one end of said latch members being pivotally engaged with the rod portion on one side of the channel member, the other end of said latch members having a releasable latch engaged with the rod portion on the other side of said channel member, said channel member being dimensioned to permit wires to be seated therein and extend vertically thereof and to exit and enter through the spaces between said wire rods defining said central web portion and said side portions, and said latch members being readily releasable and pivotable into a channel opening position to facilitate movement of wires in said channel member.

10. The wire management rack installation in accordance with claim 9 wherein said channel member further comprises:
(a) a plurality of elongated rod elements extending vertically along a length of said side portions and said central web portion; and
(b) a plurality of U-shaped rod elements spaced vertically along the length of said side portions and said central web portion.

11. The wire management rack installation in accordance with claim 10 wherein each of said central web portion and said side portions further comprises three laterally spaced rod elements.

12. The wire management rack installation in accordance with claim 9 wherein said pair of arms is provided by U-shaped members defined by vertically spaced, horizontally extended rod elements having a web portion extending across said central web portion of said channel member and arm portions extending along said side portions of said channel member and outwardly therefrom with a connecting portion between the outer ends of said arm portions.

13. The wire management rack installation in accordance with claim 12 wherein said rod elements of said U-shaped members are secured to said rod elements of said channel members at their points of contact.

14. The wire management rack installation in accordance with claim 9 wherein there are included attachment means spaced vertically along the length of said central web portion of said channel member and engaged therewith, said attachment means being engaged with said uprights of the wire management racks.

15. The wire management rack installation in accordance with claim 14 wherein said attachment means includes a first member having a body portion extending across said central web portion of said channel member and flange portions engaged with rod elements of said channel member and fasteners extending through apertures in said body portion and engaged with said uprights.

16. The wire management rack installation in accordance with claim 15 wherein said attachment means includes a second member of generally L-shaped configuration with a body portion engaged with said body portion of said first member and a flange portion engaged with one of said uprights.

* * * * *